Jan. 16, 1934.  P. W. YOUNG  1,943,882
ROTARY ENGINE
Filed March 25, 1930  3 Sheets-Sheet 1
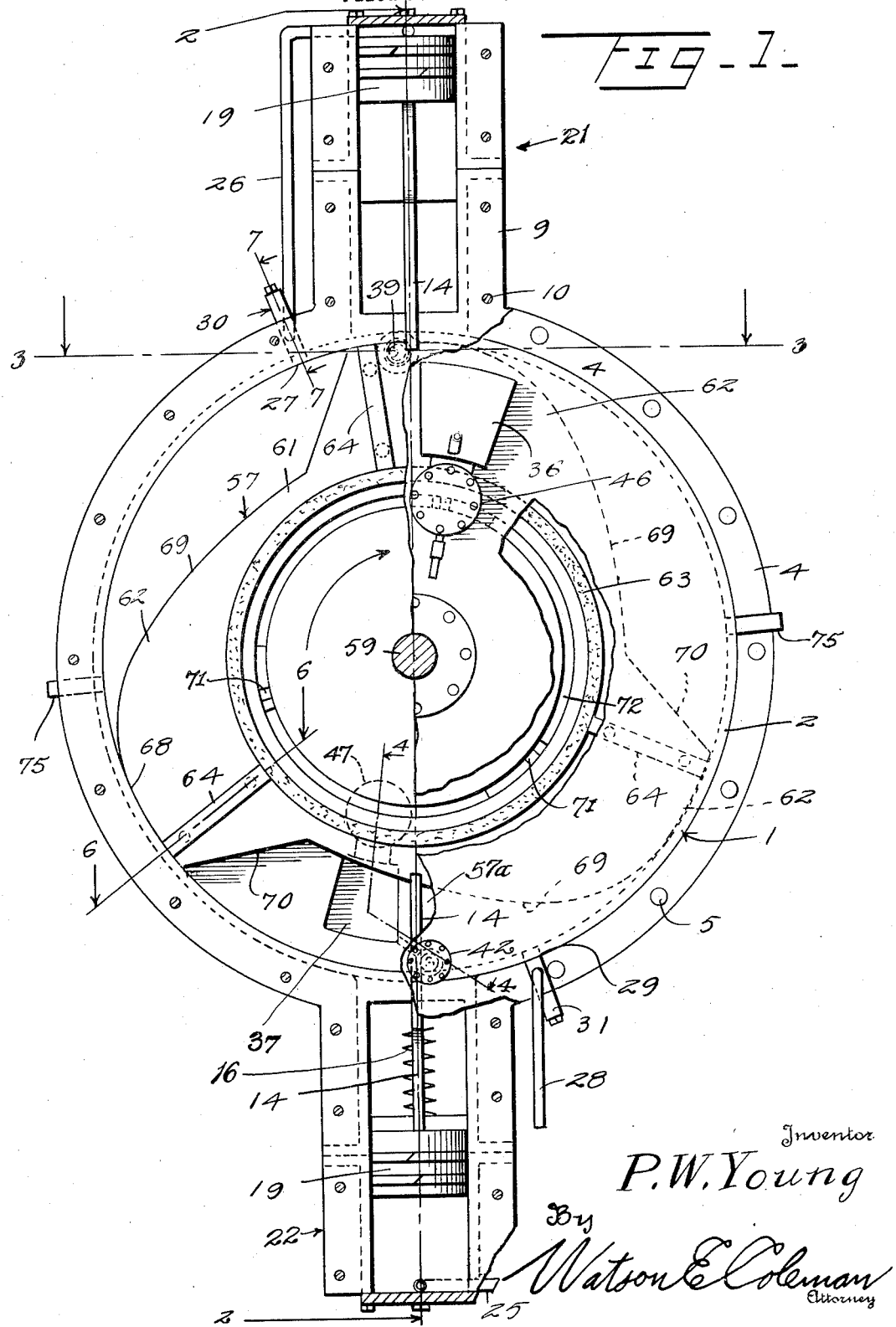

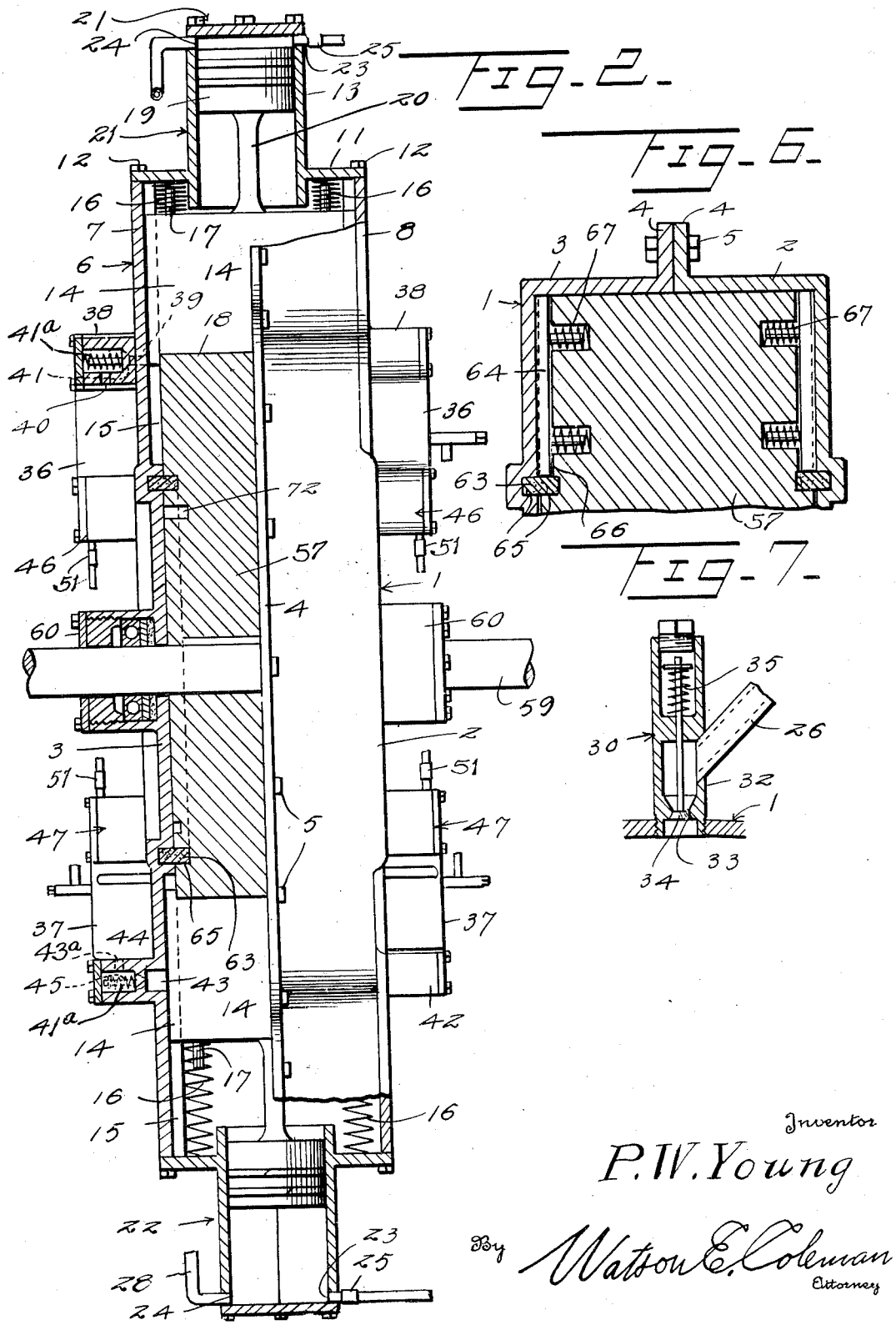

Jan. 16, 1934.　　　　P. W. YOUNG　　　　1,943,882
ROTARY ENGINE
Filed March 25, 1930　　3 Sheets-Sheet 3
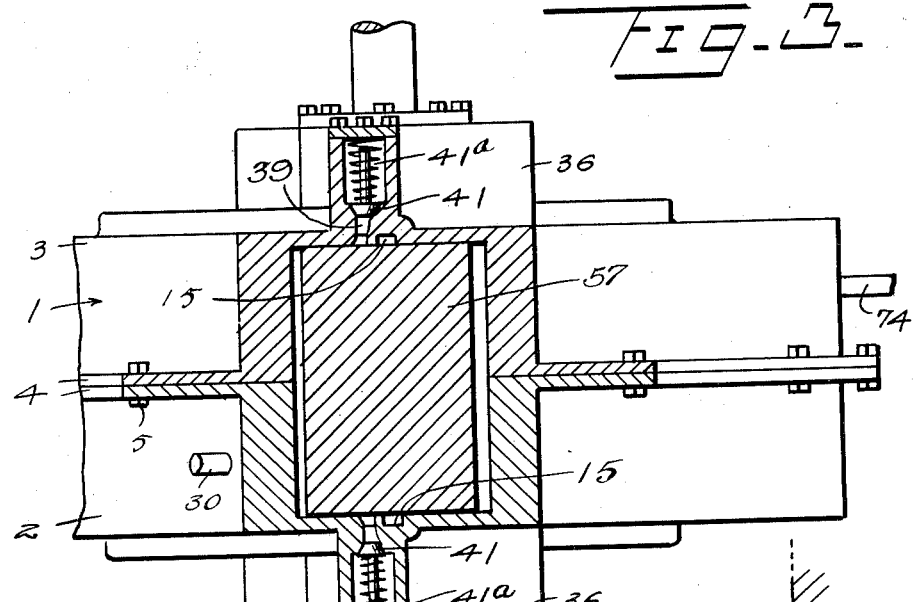
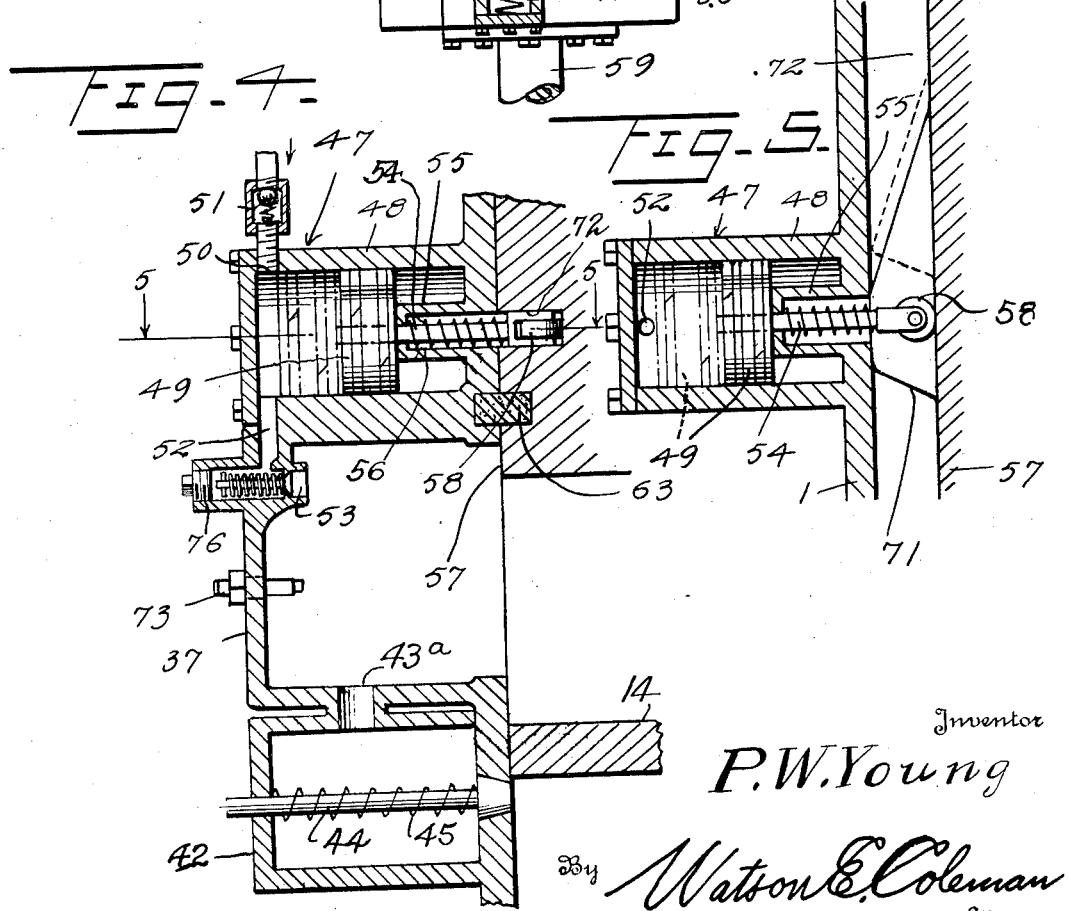
Inventor
P. W. Young
By Watson E. Coleman
Attorney Patented Jan. 16, 1934

1,943,882

UNITED STATES PATENT OFFICE 1,943,882

ROTARY ENGINE

Paul W. Young, Taft, Calif.

Application March 25, 1930. Serial No. 438,781

3 Claims. (Cl. 60—44)

This invention relates to rotary engines, and has for one of its objects to provide a novel and highly efficient engine of this character which shall be adapted to utilize any combustible liquid or gas, steam, compressed air or any non-combustible liquid under compression as a motive medium, and which shall be adapted to utilize the force of the medium employed to effect a continuous forward motion without any reciprocating action.

The invention has for a further object to provide an engine of the character stated which shall be simple and capable of being easily manufactured at a low cost, and which shall be adapted to be maintained in a highly efficient condition with comparatively little labor and expense.

With the foregoing and other objects in view, the nature of which will appear as the description proceeds, the invention consists in the construction, combination and arrangement of parts hereinafter fully described and claimed, and illustrated in the accompanying drawings, wherein:—

Figure 1 is a view partly in front elevation and partly in vertical section of a rotary engine constructed in accordance with my invention, the section being taken on a plane located at right angles to the axis of the engine;

Figure 2 is a view partly in side elevation and partly in vertical section of the engine, the section being taken on the plane indicated by the line 2—2 of Figure 1;

Figure 3 is a sectional view taken on the horizontal plane indicated by the line 3—3 of Figure 1;

Figure 4 is a sectional view taken on the plane indicated by the line 4—4 of Figure 1;

Figure 5 is a sectional view taken on the plane indicated by the line 5—5 of Figure 4;

Figure 6 is a sectional view taken on the plane indicated by the line 6—6 of Figure 1, and Figure 7 is a sectional view taken on the plane indicated by the line 7—7 of Figure 1.

The engine comprises a cylindrical casing 1 which consists of similar sections 2 and 3. The casing sections 2 and 3, which are of cylindrical formation in elevation, are provided at the meeting edges of their annular walls with outer annular flanges 4, and are secured together by bolts 5 passing through the flanges. Housings 6 extend radially from the annular wall of the casing 1, and are arranged in diametrically opposed relation. The housings 6, which also extend across or transversely of the casing 1, communicate at their inner ends with the interior of the casing, and are of sectional formation. The housing sections 7 and 8 are formed integrally with the casing sections 2 and 3, respectively, and are provided with flanges 9 for the reception of bolts 10 by which they are secured together. The outer ends of the housings 6 are closed by plates 11 which are secured in place by cap screws 12. Cylinders 13 which are formed integrally with the plates 11, extend outwardly from the housings 6, and communicate at their inner ends with the interior of the housings.

Abutments 14, which extend across or transversely of the casing 1 are mounted in radial grooves 15 formed in the casing 1 and housings 6 for sliding movement into and out of the casing. Springs 16 are arranged between the outer ends of the abutments 14, and constantly tend to urge the abutments into the casing 1. The springs 16 are mounted upon guide pins 17 carried by the outer ends of the abutments 14. The inner ends of the abutments 14 are provided with recesses 18 which extend in the direction of the length thereof and are equal in length to the inner axial dimension of the casing 1. Pistons 19 are slidably mounted in the cylinders 13 and are connected by rods 20 to the abutments 14 for operation through the medium of the abutments.

Each of the cylinders 13 and its piston 19 constitute an air charging means, and these means are generally designated 21 and 22, respectively. The cylinders 13 are provided with intake ports 23 and discharge ports 24, the intake ports being under the control of outwardly seating and spring actuated check valves 25. These valves 25 are similar in detail to valves 51 shown in Fig. 4. The discharge port 24 of the air charging means 21 is connected by a tube 26 with an intake port 27 in the lateral wall of the casing 1 rearwardly of the head 14 associated with this air charging means. The discharge port 24 of the air charging means 22 is connected by a tube 28 with an intake port 29 in the lateral wall of the casing 1 rearwardly of the head 14 associated with this air charging means. The intake ports 27 and 29 are under the control of valves 30 and 31, respectively. These valves are similar, and each constitutes, as shown in Figure 7, a casing 32 having an inwardly facing valve seat 33, a valve head 34 and a spring 35 normally retaining the valve head seated.

The tubes 26 and 28 communicate with the casing 32 outwardly of the valve heads 34 so as to permit the air being forced from the charging means 21 and 22 to unseat the valve heads and enter the casing 1. The casing 1 is provided at opposite sides thereof with combustion chambers 36 which extend outwardly therefrom and communicate with the interior of the casing 1 in advance of the abutment 14 associated with the air charging means 21. The casing is provided at its opposite sides with combustion chambers 37 which extend outwardly therefrom and communicate at their inner ends with the interior of the casing 1 in advance of the abutment 14 associated with the air charging means 22. Valve casings 38 extend outwardly from the opposite sides of the casing 1, and communicate by way of passages 39 with the interior of the casing in rear of the abutment 14 associated with the air charging means 21, and they communicate with the combustion chamber 36 by way of ports 40. The passages 39 are under the control of inwardly seating valve heads 41 which are constantly urged in the direction of their closed position by springs 41a. Similar valve casings 42 communicate by way of passages 43 with the interior of the casing 1 in rear of the abutment 14 associated with the air charging means 22, and they communicate with the combustion chambers 37 by way of ports 43a. The valve heads 44 of these casings also seat inwardly and are constantly urged in the direction of their closed position by springs 45. Fuel charging means 46 are associated with the combustion chambers 36 and fuel charging means 47 are associated with the combustion chambers 37.

The fuel charging means 46 and 47 are similar, and as shown in Figures 4 and 5, each of these means comprises a cylinder 48 and a piston 49. The cylinders 48 are each provided with an intake port 50 which is under the control of an outwardly seating and spring actuated check valve 51, and with a discharge port 52 which communicates with a spray nozzle 53 arranged in each of the combustion chambers. Each of the pistons 49 is slidably mounted in its cylinder 48, and is provided with a rod 54 slidably arranged in a guide 55 carried by the inner end of the cylinder. Each of the pistons 49 is moved inwardly under the influence of a coil spring 56, and is moved outwardly by the impeller 57 of the engine, the piston rod being provided with a roller 58 for contact with the impeller.

The impeller 57 is concentrically journaled in the casing 1 by a shaft 59 to which it is fixed and which is journaled in bearings 60 extending outwardly from the sides of the casing. The impeller 57 is provided with cylindrical central or hub portion 61 and with similarly formed pistons 62 which extend radially from the hub portion in equally spaced relation. The sides of the hub 61 and the pistons 62 contact with the inner faces of the sides of the casing 1, and this contact is rendered liquid and gas proof by packing rings 63 and packing strips 64. The packing rings 63 are arranged in annular grooves 65 formed in the hub 61 and side walls of the casing 1. The packing strips 64 are arranged in radial grooves 66 formed in the opposite sides of the pistons 62 and are held in contact with the opposite side walls of the casing by springs 67.

The impeller 57 turns in a clockwise direction, as indicated by the arrow in Figure 1. The outer ends 68 of the piston 62 are arcuate and have a snug contact with the annular wall of the casing 1. The front sides 69 of the pistons 62 curve inwardly and forwardly, and the rear sides 70 of the pistons are straight. The rear sides 70 of each piston 62 constitutes a shoulder between which and one of the heads 14, the motive medium employed expands to impart rotation to the impeller 57.

The engine is of the external combustion type. During the rotation of the impeller, one of the abutments 14 is moved outwardly and the other is moved inwardly. The abutments 14 are moved outwardly by the curved sides 69 of the pistons 62 and moved inwardly by the springs 16. During their outward movements, the abutments 14 impart a corresponding movement to the pistons 19, and during their inward movements, the abutments impart a corresponding movement to the pistons. During the inward movements of the pistons 19 air will be drawn into the cylinders 13 by way of the intake ports 23, and during the outward movements of the pistons the air will be forced from the cylinders into the casing 1 by way of the inlet ports 27 and 29. One of the abutments 14 is being moved outwardly while the other is being moved inwardly, with the result that while air is being drawn into one of the cylinders 13 it is being discharged from the other into the casing 1. The air being forced thereinto enters the casing 1 at a point between the outwardly moving abutment 14 and that curved piston side following that piston side 69 moving the abutment outwardly, the abutment curved piston side and the adjacent walls of the casing 1 constituting a compression chamber for the reception of the incoming air.

As the outer end of the curved piston side 69 approaches the head, the area of the chamber is reduced, with the result that the air in the chamber is compressed. The pistons have a snug fit with the walls of the recesses 18 in the inner ends of the abutments 14, and due thereto and to the packing rings 63 and packing strips 64, the air under compression will not escape from the constantly reducing chamber. When the pressure of the air in the chamber is great enough to overcome the tension of the springs of the valve heads controlling communication between the constantly reducing chamber and the combustion chambers located immediately in front of the abutment being moved outwardly, the air will pass from said first chamber into said second chambers, as illustrated in the lower part of Figure 1, wherein said first chamber is designated 57a and said second chamber 37a. While the pistons 49 of one of the fuel charging means 46 and 47 are being forced inwardly, the pistons of the other fuel charging means are being forced outwardly, with the result that charges of fuel are drawn into and expelled from the cylinders 48. The pistons 49 are moved inwardly by the springs 56 and are moved outwardly by the high points 71 of the cam grooves 72 formed in the sides of the impeller 57. The rollers 58 connected to the piston rods 54 are arranged in the cam grooves 72 and the high points 71 are arranged in alinement with the pistons 62. The fuel charging means associated with the combustion chambers receiving the air from the casing 1 are being moved outwardly while the fuel charging means associated with the other combustion cylinders are being moved inwardly, with the result that as soon as the combustion chambers receive the air from the casing, a charge of fuel will be sprayed into such combustion chambers.

This fuel may be ignited by means of a spark plug or by the temperature to which the air is raised during its compression in the casing 1.

The spark plugs will, when employed, be carried by the combustion chambers 36 and 37 as suggested in Figure 4, wherein the spark plug is designated 73. The head 14 against which the air was compressed in the casing 1 and which also moved outwardly during the compression, moves inwardly against the advancing piston shoulder 70, and the gases resulting from the ignition of the fuel flow into the casing between the head and shoulder and impart a rotary impulse to the impeller 57.

The casing 1 is provided with an exhaust port 74 arranged between the combustion chambers 36 and the intake port 29 and with an exhaust port 75 arranged between the combustion chambers 37 and the intake port 27. As the piston 62 receiving the rotary impulse passes an exhaust port, the spent gases pass through such port, and the air entering the casing 1 through the succeeding intake port functions initially to expel all of the spent gases from the casing 1. This initial action of the incoming air takes place before the piston cooperates with the adjacent head to form the chamber for the air, which chamber as hereinbefore stated, is reduced in area by the movement of the piston to compress the air and force it into the adjacent compression chambers. The spray nozzles 53 are provided with outwardly unseating valves 76 which are similar to the valves 30 shown in Figure 7.

While I have described the principle of the invention together with the structure which I now consider the preferred embodiment thereof, it is to be understood that the structure shown is merely illustrative and that such changes may be made, when desired, as fall within the scope of the invention as claimed.

I claim:—

1. A rotary engine comprising a casing, a power cylinder in the casing, an impeller journaled in the casing, said impeller including pistons contacting at one point with the wall of the cylinder and having an eccentric intermediate portion extending inwardly of the cylinder wall, an air compressor cylinder carried by the casing, a reciprocable piston in the air cylinder, an abutment slidable with the piston and engaging the outer edge of a piston for operation thereby, means constantly holding the abutment into contact with a piston, a combustion chamber on one side of the abutment, a spring pressed compression valve on the opposite side of the abutment and having communication with the combustion chamber, means for discharging fuel into the combustion chamber, fuel ignition means, means for discharging air from the air compressing cylinder into said power cylinder on said opposite side of the abutment, and means for exhausting the burned gases from the power cylinder.

2. A rotary engine comprising a casing, a power cylinder in the casing, an impeller journaled in the casing, said impeller including pistons contacting at one point with the wall of the cylinder and having an eccentric intermediate portion extending inwardly of the cylinder wall, an air compressor cylinder carried by the casing, a reciprocable piston in the air cylinder, an abutment slidable with the piston and engaging the outer edge of a piston for operation thereby, means constantly holding the abutment into contact with the piston, a combustion chamber carried by the casing on one side of the abutment, a spring pressed compression valve carried by the casing on the opposite side of the abutment and having communication with the combustion chamber, fuel ignition means, means for spraying fuel within the combustion chamber, means for discharging air from the air compressing cylinder into said power cylinder on the opposite side of the abutment, a check valve in said discharging means, and means for exhausting the burned gases from the power cylinder.

3. A rotary engine comprising a casing, a power cylinder in the casing, an impeller journaled in the casing, said impeller including pistons contacting at one point with the wall of the cylinder and having an eccentric intermediate portion inwardly of the cylinder wall, an air compressor cylinder carried by the casing, a reciprocable piston in the air cylinder, an abutment slidable with the piston and engaging the outer edge of a piston for operation thereby, means constantly holding the abutment in contact with a piston, a combustion chamber carried by the casing on one side of the abutment, a spring pressed compression valve on the opposite side of the abutment and having communication with the combustion chamber, fuel discharging means in the combustion chamber, a compressing means adjacent the combustion chamber and communicating therewith, means for discharging air from the air compressing cylinder into said power cylinder on the opposite side of the abutment, and an exhaust port carried by the power cylinder in a position whereby the compressed air will scavenge the power cylinder prior to the closing of the exhaust port.

PAUL W. YOUNG.